(12) United States Patent
Putz

(10) Patent No.: US 9,970,498 B2
(45) Date of Patent: May 15, 2018

(54) ELECTRICALLY ACTUATED FRICTION BRAKE

(71) Applicant: VE VIENNA ENGINEERING FORSCHUNGS-UND ENTWICKLUNGS GMBH, Vienna (AT)

(72) Inventor: Michael Putz, Sebersdorf (AT)

(73) Assignee: VE VIENNA ENGINEERING FORSCHUNGS-UND ENTWICKLUNGS GMBH, Vienna (AT)

( * ) Notice: Subject to any disclaimer, the term of this patent is extended or adjusted under 35 U.S.C. 154(b) by 164 days.

(21) Appl. No.: 14/850,216

(22) Filed: Sep. 10, 2015

(65) Prior Publication Data

US 2015/0377309 A1 Dec. 31, 2015

Related U.S. Application Data

(63) Continuation-in-part of application No. PCT/EP2014/054531, filed on Mar. 10, 2014.

(30) Foreign Application Priority Data

Mar. 11, 2013 (AT) .............................. A50165/2013

(51) Int. Cl.
*F16D 65/18* (2006.01)
*F16D 55/225* (2006.01)
(Continued)

(52) U.S. Cl.
CPC ........... *F16D 65/18* (2013.01); *F16D 55/225* (2013.01); *F16D 2121/14* (2013.01);
(Continued)

(58) Field of Classification Search
CPC .. F16D 65/18; F16D 2121/14; F16D 2125/36; F16D 2125/30; F16D 2125/32;
(Continued)

(56) References Cited

U.S. PATENT DOCUMENTS 4,546,298 A * 10/1985 Wickham .............. B60T 8/1893
188/162
5,501,305 A * 3/1996 Stalmeir ............. F16D 55/2245
188/153 R
(Continued)

FOREIGN PATENT DOCUMENTS

DE 3718955 A1 * 12/1988 .............. B60T 8/326
DE 38 24 812 1/1990
(Continued)

OTHER PUBLICATIONS

Internal Search Report issued in PCT/EP2014/054531 dated May 15, 2014.
(Continued)

*Primary Examiner* — Anna M Momper
*Assistant Examiner* — Mahbubur Rashid
(74) *Attorney, Agent, or Firm* — Greenblum & Bernstein, P.L.C.

(57) ABSTRACT

To reduce the attainable actuation times of an electrically actuated friction brake and simultaneously keep the friction brake inexpensive, an electrically actuated friction brake with a brake pad (3) actuated by an actuation device (10) is proposed, wherein for braking the actuation device (10) is driven by a spring and is held open by an electrical actuator (12), so that the spring actuates the friction brake (1) in case of a power loss, wherein a first transmission element (5), that is connected to the brake pad (3), and a second transmission element (8) with an elevation curve (17) are provided and a coupling element (15) is provided on the first transmission
(Continued)

element (5), wherein a follower element (14) is arranged on the coupling element (15) that follows the elevation curve (17) under the action of the spring for actuating the first transmission element (5).

17 Claims, 5 Drawing Sheets

(51) Int. Cl.
    *F16D 121/24* (2012.01)
    *F16D 125/64* (2012.01)
    *F16D 127/00* (2012.01)
    *F16D 121/14* (2012.01)
    *F16D 125/32* (2012.01)
    *F16D 121/18* (2012.01)
    *F16D 125/30* (2012.01)
    *F16D 121/26* (2012.01)

(52) U.S. Cl.
    CPC ...... *F16D 2121/18* (2013.01); *F16D 2121/24* (2013.01); *F16D 2121/26* (2013.01); *F16D 2125/30* (2013.01); *F16D 2125/32* (2013.01); *F16D 2125/64* (2013.01); *F16D 2125/645* (2013.01); *F16D 2127/007* (2013.01)

(58) Field of Classification Search
    CPC ............... F16D 59/02; F16D 2023/123; F16D 2121/26; F16D 2125/38; F16D 2125/64; F16D 2125/645; F16D 2127/007
    USPC ........................................................ 188/156
    See application file for complete search history.

(56) References Cited

U.S. PATENT DOCUMENTS

| | | | |
|---|---|---|---|
| 6,845,853 B2 * | 1/2005 | Baumann ................ | F16D 65/18 188/167 |
| 6,851,525 B2 | 8/2005 | Baier-Welt | |
| 7,806,239 B2 * | 10/2010 | Tonoli .................. | B60T 13/741 188/156 |
| 8,069,962 B1 * | 12/2011 | Semsey ................ | F16D 55/226 188/72.8 |
| 9,127,735 B2 | 9/2015 | Putz | |
| 2002/0104733 A1 | 8/2002 | Tulaczko | |
| 2003/0034212 A1 * | 2/2003 | Gradert .................. | B60T 13/04 188/167 |
| 2004/0026184 A1 * | 2/2004 | Baumann ................ | F16D 65/18 188/72.7 |
| 2005/0029858 A1 | 2/2005 | Forster | |
| 2005/0126865 A1 * | 6/2005 | Sato .......................... | B25B 5/12 188/156 |
| 2008/0185240 A1 * | 8/2008 | Cao ....................... | F16D 65/092 188/72.2 |
| 2010/0025165 A1 * | 2/2010 | Utzt ....................... | F16D 65/18 188/71.8 |
| 2012/0168264 A1 | 7/2012 | Putz | |

FOREIGN PATENT DOCUMENTS

| | | | |
|---|---|---|---|
| DE | 197 23 394 | 12/1997 | |
| DE | 198 51 668 | 5/2000 | |
| DE | 101 40 075 | 2/2003 | |
| DE | 10161500 A1 * | 6/2003 | ............. B60T 7/107 |
| DE | 102006012076 | 9/2007 | |
| DE | 102009029594 | 3/2011 | |
| DE | 102011102904 A1 * | 1/2012 | |
| EP | 1 726 499 | 11/2006 | |
| EP | 1770299 A2 * | 4/2007 | ............. F16D 23/12 |
| FR | 2828918 A1 * | 2/2003 | ............. F16D 65/14 |
| GB | 2 313 885 | 12/1997 | |
| JP | 10-81158 | 3/1998 | |
| WO | WO 01/44677 | 6/2001 | |
| WO | WO 01/90595 | 11/2001 | |
| WO | WO 0225136 A1 * | 3/2002 | ............. F16D 65/18 |
| WO | WO 03016745 A2 * | 2/2003 | ............. B60T 13/741 |
| WO | WO 2004/048792 | 6/2004 | |
| WO | WO 2010/0133463 | 11/2010 | |
| WO | WO 2014/139919 | 9/2014 | |

OTHER PUBLICATIONS

Austrian Search Report issued in counterpart Austrian application No. A 50165/2013.
Chinese Search Report and Office Action issued in CN 2014800226222 (18 pages).

* cited by examiner

ELECTRICALLY ACTUATED FRICTION BRAKE

CROSS-REFERENCE TO RELATED APPLICATIONS

The present application is a Continuation-in-Part of International Patent Application No. PCT/EP2014/054531 filed Mar. 10, 2014, which claims priority of Austrian Patent Application No. A50165/2013 filed Mar. 11, 2013. Moreover, the disclosure of International Patent Application No. PCT/EP2014/054531 is expressly incorporated by reference herein in its entirety.

BACKGROUND OF THE INVENTION

1. Field of the Invention

Embodiments of the present invention relate to an electrically actuated friction brake with a brake pad actuated by an actuation device.

Embodiments of the present invention relate to electrically actuated brakes, thus to brakes in which an electrical actuator such as an electric motor, via transmission parts such as levers, screws, ball screws, cams, eccentrics, fluids, gases, etc., presses on the brake pad, such as a brake disc for example, on the friction surface, such as a brake disc or brake drum, for example. The design of the force characteristics over the actuation travel in electrically actuated brakes is important for the actuation time and the energy expenditure for applying the braking torque.

2. Discussion of Background Information

Especially for electrically actuated service brakes of vehicles, there are high standards with regard to short actuation times and pressing force requirement. For example, today's vehicles demand an actuation time for full braking of around 200 ms. At the same time, in modern vehicle front wheel disc brakes, brake pad pressing forces of 30 to 40 kN can arise, in many cases even significantly more. Since actuation travel*pad pressing force is the energy requirement for actuation of the brake and leads to the required actuation power for a given actuation time, it is apparent that the electrical actuators require accordingly high levels of electrical power. If an actuation travel of 2 mm is covered for full braking for 40 kN of pad pressing force, the energy requirement is roughly 40 Ws. If the braking process here takes 0.2 s, an average mechanical power of at least 200 W per brake is required, which must be provided by the electrical actuator. Available mounting space, weight, costs, and current requirement for the electrical actuator require that the motor power be kept low, which is why an optionally large electrical actuator cannot be used.

For a linear electrically actuated brake, i.e., for linear transmission elements such as screws, ball screws, and fluids with a linear relationship between the actuation travel and actuator (force, torque), a pad pressing force rising linearly from zero to a maximal value is necessary, under the assumption of a constant coefficient of friction. The necessary transmission ratio of the linear brake is determined here by the required maximal force (full braking), as this must be guaranteed, and remains constant for all lower pad pressing forces. That is disadvantageous, however, because, in all other, generally more frequent cases, the electrical actuator cannot be optimally utilized and is over-dimensioned. For such a linear brake, the electrical actuator is thus operated, up to design full braking, with a smaller than possible load, while the transmission ratio and thus also the attainable actuation time are determined by the constantly high transmission specified for the case of full braking. As a result, optimal and/or short-as-possible actuation times cannot be achieved for linear brakes for braking that does not correspond to the case of full braking.

In addition, the cost pressure on electrically actuated brakes is also high, because they have to compete with relatively simple hydraulic brakes. Therefore, any possible cost optimization of the electrical actuator is important. It is understood here that the smaller the electrical actuator can be kept, the more advantageous it will be.

Non-linear electrically actuated brakes such as those described in WO 2010/133463 A1, in which a non-linear transmission element, such as a cam, eccentric, non-linear ramp, etc., is provided between the actuator and brake pad, offer an improvement over linear brakes. In WO 2010/133463 A1, for example, a shaft with an eccentric pin, or a cam to which the brake pad is secured, is turned by an actuation device. Here the torque of an electric motor is transmitted via a linkage and lever to the non-linear transmission element of the brake. Due to the eccentricity of the pin or cam, the brake pad is pressed against the friction surface, and a non-linear relationship arises between the actuation travel or angle of rotation of the shaft and the pad pressing force or the arising braking torque. Due to the eccentric or cam, a force transmission also arises (a small travel effects a high force), whereby the electrical actuator can be dimensioned so as to be smaller. This also makes it possible to shorten the actuation times in comparison with a linear electrically actuated brake.

As a rule, the installation conditions of the brake, in particular for vehicle brakes, are such that only a very limited mounting space is available to receive the brake, so that electrical motors of small size have to be used. The very high pressing force of the brake pad must be produced from the high speed of the preferably small electric motor. Instead of the linkage and lever of WO 2010/133463 A1, this can be also be achieved, for example, by a transmission driven by an electric motor. For example, the output stage of the transmission rotates the shaft that is integrated in the transmission and has the eccentric or cam, while the non-linear transmission element again acts on the brake pad. With such a transmission, even transmissions of 1:40 can be implemented in a tiny mounting space, whereby small electric motors can be used. The actuation time can thus be reduced even further. But such transmissions are very complex and therefore also expensive.

A parking brake is known from WO 01/90595 A1 in which a brake actuating linkage is actuated by an electrically driven drive connection. The drive connection is embodied in the form of a cam disc that is rotated by the electric motor and an adjusting element guided along a surface of the cam disc. The cam disc can be embodied such that a constant torque is set on the electric motor in order to shorten the braking time and to achieve a particularly rapid translational movement of the brake actuating linkage.

For release of a friction brake, often a return spring is tensioned, which is released during release of the friction brake, and opens the friction brake by the energy released thereby. For example, DE 10 2006 012 076 A1 shows an electrically actuated friction brake in which a return spring is tensioned during actuation, and is released for release. The electrical drive must therefore supply energy for tensioning the release spring during the entire actuation of the friction brake.

SUMMARY OF THE EMBODIMENTS

Embodiments of the present invention seek to reduce the attainable actuation times of an electrically actuated friction brake and simultaneously to keep the friction brake inexpensive.

According to embodiments of the invention, for braking, the actuation device is driven by a spring and is held open by an electrical actuator, so that the spring actuates the friction brake in case of a power loss, wherein a first transmission element, that is connected to the brake pad, and a second transmission element with an elevation curve are provided and a coupling element is provided on the first transmission element, wherein a follower element is arranged on the coupling element that follows the elevation curve under the action of the spring for actuating the first transmission element. The second transmission element can supply much of the transmission required in the actuation device, whereby the electrical actuator is relieved. Due to the additional transmission of the second transmission element, however, the actuation time of the friction brake is also reduced.

The connection of the coupling element and of the first transmission element is done in a mechanically very simple manner if a first end of a lever in the coupling element is rotatably mounted and a second end of the lever is connected to the first transmission element.

A very especially simple and advantageous embodiment results if the second transmission element is embodied as a cam disc or as a sliding guide with an elevation curve and the spring rotates the cam disc or the sliding guide. In this way, the actuation device can be implemented by simple and robust device and in a very compact manner.

If two first transmission elements are provided, it is advantageous if they each be connected via a lever to the coupling element for formation of a parallelogram drive. By way of the parallelogram, a forced synchronization of the two transmission elements is effected in a simple and inexpensive manner.

In an alternative embodiment, the coupling element is designed as a rocker lever, whose knee joint is guided by a follower element along the elevation curve, wherein the spring acts on the first leg of the rocker lever, and the other leg of the rocker lever is connected to the first transmission element. By way of the rocker lever, especially high transmissions can be implemented in the second transmission element.

A very simple parking brake function can be implemented if an indentation is provided in the elevation curve, in which the follower element assumes a stable position. The actuation device can thus be fixed in a specific position (parking brake) and can no longer be released except by an outside force.

The first transmission element is preferably embodied as an eccentric drive or a cam drive, since high transmissions can thereby be implemented with short actuation travels.

It is very especially advantageous if the elevation curve is formed according to the path translation characteristic of the first transmission element.

Advantageously, the spring acts on a spring cam arranged on the first transmission element. Thereby it is advantageous when a spring lever is provided on which the spring acts, wherein a first end of the spring lever is rotatably mounted and a spring follower element, that follows the spring cam, is arranged on the other end of the spring lever.

Further effects and advantages of the of the present friction brake follow from the following description.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
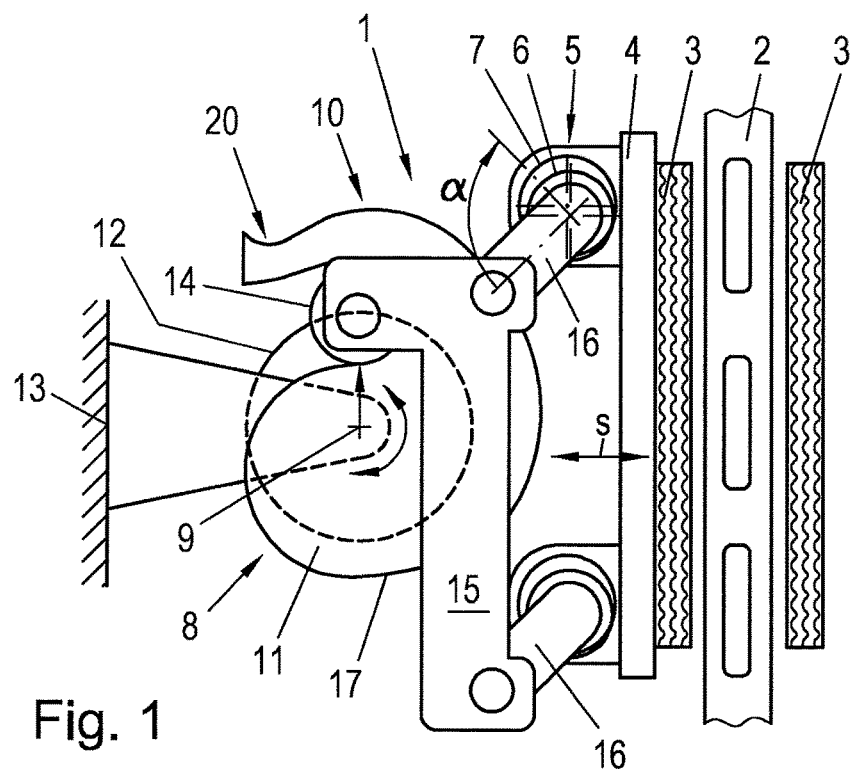
FIG. 1 shows a representation of a friction brake according to the invention.

FIG. 1 shows schematically an advantageous exemplary embodiment of a friction brake 1 according to the invention, here in the form of a disc brake with a brake disc as a friction surface 2 and a brake pad 3, which is pressed by an actuation device 10 on the friction surface 2 for braking. The friction brake 1 could also be embodied as a drum brake, however, and could of course also brake linear movements, i.e., a flatiron as a friction surface instead of a brake disc, for example. Like here, the brake pad 3 can also be arranged on a brake pad carrier 4. The friction brake 1 can be designed as a sufficiently known floating caliper brake, for example. Components of such a friction brake 1 known per se are not shown here for reasons of clarity, or are only suggested.

A first transmission element 5 connected to the brake pad 3 (or the pad carrier 4) and interacting with same acts on the brake pad 3 or the pad carrier 4. The first transmission element 5 is embodied here, for example, as an actuation shaft 6, on which an eccentric journal 7 is provided (suggested by the displaced rotational axes). For example, an eccentric journal 7 can be formed on the actuation shaft 6, or an eccentric, axial borehole, into which a journal 7 is inserted, can be provided in the actuation shaft 6. The actuation shaft 6 is rotatably mounted on a fixed part, for example on the brake caliper, or quasi-fixed part, for example on a wear adjuster, of the friction brake 1. The brake pad 3 or the pad carrier 4 is arranged on the journal 7. If the actuation shaft 6 is pivoted by a rotational angle α, the brake pad 3 moves the actuation travel s toward the friction surface 2 or away from same (suggested by the double arrow), depending on the direction of rotation. Instead of an eccentric journal 7, a cam can also be provided as the transmission element 5. For example, a rotational angle α of 90° from non-braking to full braking can be provided, and the eccentric or the cam can be geometrically designed in order to ensure the actuation travel s necessary for braking. This type of actuation of a friction brake 1 is described in WO 2010/133463 A1.

Moving the brake pad 2 against the friction surface 2 by a first transmission element 5 produces, starting with contact, a normal force (pad pressing force $F_N$) that effects the braking force or the braking torque. The normal force is thereby produced by the first transmission element 5 and is also received in full by the latter. That is, the normal force is fully supported by the transmission element 5. Even an increased normal force due to potentially arising self-reinforcement effects is supported by the transmission element 5.

In principle, the pressing of the brake pad 3 against the friction surface 2 can be implemented with any geometry and method that brings a "height gain," i.e., a travel in the direction of the brake pad 3. The first transmission element 5 is preferably non-linear. This means that there is no linear relationship between the input (here the rotational angle α, for example) and the output (here the actuation travel s, for example). It is also conceivable for the first transmission element 5 to be linear, however, for example as a cam with a linear elevation curve. The first transmission element 5 is also conceivable as a ball ramp or as rolling movement with thread turns. A cam is a rolled oblique plane, whereby it also being possible for the rolled plane to be rolling or in an any curve or surface in a plane or space, for example also as a helix or multiple helix, such as a ball ramp, thread turns, or rolling pitch, for example. Likewise, the first transmission element 5 can also comprise a hydraulic or pneumatic cylinder with pistons that is actuated for example by an eccentric or cam.

According to the invention, a second transmission element 8 is now provided in the friction brake 1 which interacts with the first transmission element 5 as described below.

Here, the second transmission element 8 comprises a cam disc 11 rotatably mounted on a center of rotation 9 and having an elevation curve 17, which is driven by an electrical actuator 12, here for example an electric motor of a transmission motor. The cam disc 11 or the electrical actuator 12 is supported on a fixed part 13 of the friction brake 1, such as for example a brake caliper or a not shown, sufficiently known wear adjuster (regarded as quasi fixed), as suggested in FIG. 1. A follower element 14, for example a needle bearing, rolls on the cam disc 11, whereas the follower element 14 being rotatably mounted on a coupling element 15. Depending on the shape of the elevation curve 17, the second transmission element 8 is thus linear or non-linear. Furthermore, the ends of two levers 16 are rotatably mounted on the coupling element 15. In each case, the opposing ends of the levers 16 are secured to the actuation shaft 6. From a mechanical standpoint, the coupling element 15 is a roller cam follower that is simultaneously part of a parallelogram drive. Of course, only one first transmission element 5 could be provided, in which case also only one lever 16 would be necessary. Likewise, more than two first transmission elements 5 could also be provided, and thus also more than two levers 16.

If the curve disc 11 is rotated for example by the electrical actuator 12 clockwise, the follower element 14 rolls on the cam disc 11, whereby the coupling element 15 is moved up or down according to the curve shape of the cam disk 11. Due to the movement of the coupling element 15, the actuation shaft 6 is simultaneously rotated via the lever 16, and the brake pad 3 is pressed against the friction surface 2. To raise the brake pad 3 from the friction surface 2, the cam disc 11 is rotated in the opposite direction.

The kinematics of the actuation device 10 of the friction brake 1 thus consist of the path translation ratio (or equivalently the force- or torque transmission ratio) of the first transmission element 5 and the second transmission element 10.

The elevation curve 17 of the second transmission element 10 can also be implemented by a sliding guide instead of a cam disc 11. The elevation curve 17 can thus also be repeatedly rolled or spatially formed, thus enabling a range of rotation of more than 360° between the initial and end position. For example, the cam disc 11 can be formed as a helix, and the cam disc 11 can always be correctly positioned by a feed device, for example a thread. A sliding guide could also be formed in a spiral shape.

The elevation curve 17 of the cam disk 11 or a sliding guide or, more generally, any desired elevation curve 17 in space or in a plane can naturally be followed in any mechanically reasonable manner, i.e., apart from the described roller cam follower, a rocker lever or other guide of the follower element 14 as well. Following can naturally also be implemented differently than with a roller hearing, for example by a roller, a sliding contact, or a ball. Consequently, following is understood as rolling or sliding of the follower element 14 on the elevation curve 17.

The coupling element 15 can also be embodied in multiple parts, for example several elements or levers connected in an articulated manner.

The elevation curve 17 of the cam disc 11 (or of the sliding guide) can also have a range that is shaped such that the follower element 14 in this range assumes a stable or energy-favorable position, so that the second transmission element 8 therefore cannot independently return, without external forces, in the direction of the unbraked position. This is provided in FIG. 1, for example, at the end of the elevation curve 17 of the cam disc 11 in the form of an indentation 20. If the follower element 14 comes to rest in this indentation, the follower element 14 cannot advance on its own from this position without the action of an external force, for example the electrical actuator 12, a wire rope, or the like. This can be used for a parking brake function, for example.

A parking brake function can also be implemented by a detent latch. If, due to actuation of the actuation device 10, a detent latch passes a specific position and engages, the actuator position (parking position) is likewise fixed. For unlatching, for example in order to release the parking brake, the detent latch must be released again, for example by a wire rope. An electromagnet can also be used to push the detent latch against a spring. The detent latch then remains locked in the parking position without magnetic action due to friction. For release, the actuation device 12 can be moved somewhat further along, whereby the friction is reduced and the spring releases the detent latch.

Figure 2:
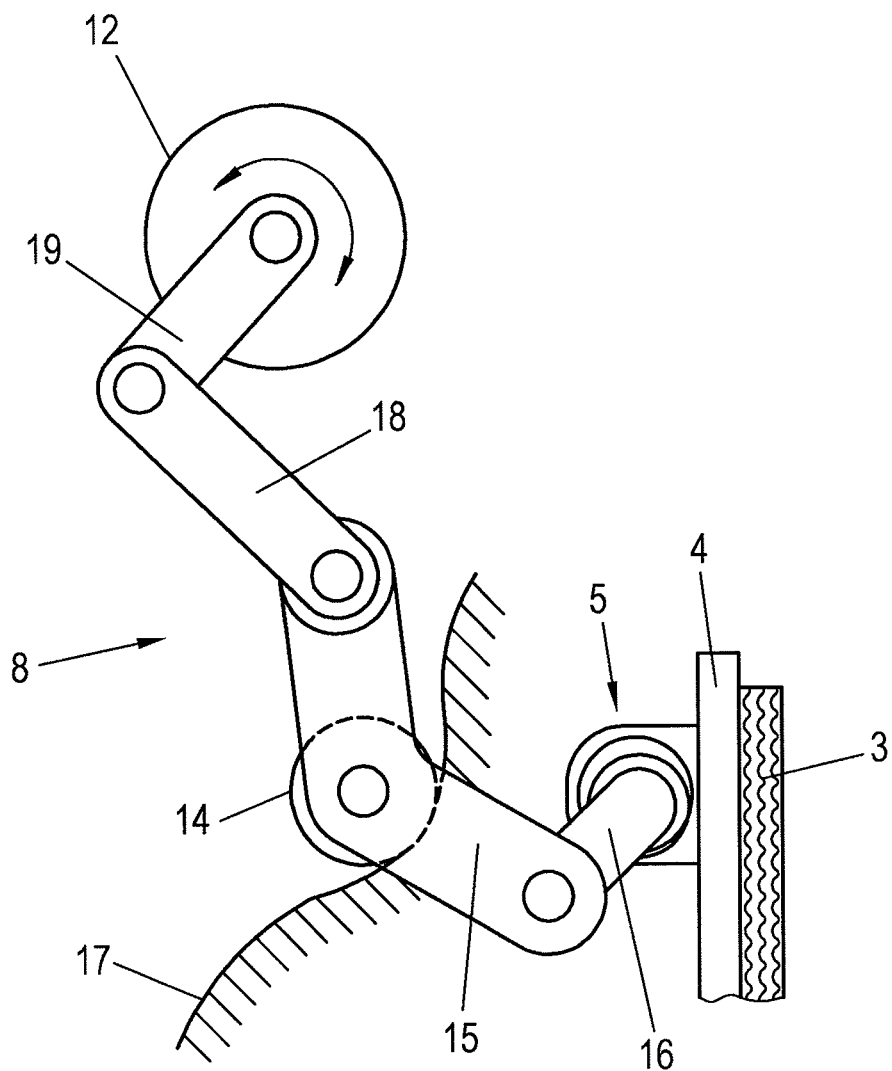
FIG. 2 shows an alternative embodiment of the actuation device.

In an alternative embodiment of the inventive friction brake 1 according to FIG. 2, a follower element 14 is again rotatably mounted on the coupling element 15, and again rolls on an elevation curve 17 of the second transmission element 8. The coupling element 15 is embodied here as a rocker lever, whereby the knee joint is rolling on the elevation curve 17 by the follower element 14. On one leg of the coupling element 15 is again hinged one end of the lever 16, by which a cam is rotated. An actuation lever 18, which is actuated by a motor lever 19 driven by the electrical actuator 12, acts on the other leg of the coupling element 15. However, a linear drive could also act on the actuation lever 18. The elevation curve 17 is arranged in a fixed position.

Other rolling guides are also conceivable. For example, the follower element 14, which rolls on the elevation curve 17, could also be guided with a sliding guide or a journal, which slides in a borehole.

Figure 3:
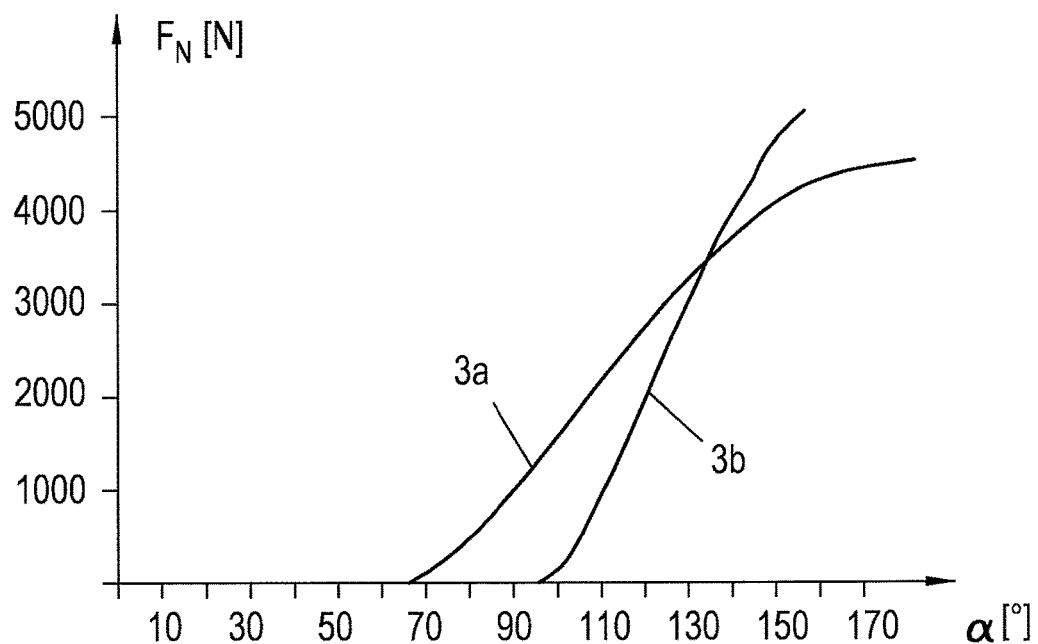
FIG. 3 shows the pad pressing force over the actuation range of the first transmission element.

The starting point for the design of a friction brake 1 according to the invention can for example be a predetermined pad pressing force $F_N$—actuation travel s diagram or a pad pressing force $F_N$—rotational angle α diagram, as shown in FIG. 3. The diagram can reflect a linear or non-linear (as in FIG. 3) relationship. Such a diagram arises for example from the fundamental brake design, which considers the stiffnesses of the brake parts and the geometry of the first non-linear transmission element 5, i.e. for example the geometric relationships on the eccentric, and is thus to be regarded as known, or it is predetermined according to the application. Different wear states of the friction brake 1 can also be considered. In FIG. 3, the curve 3a shows the brake without wear, and the curve 3b shows the brake with full wear. The stiffness of the friction brake 1 is altered significantly as a result of the wear of the brake pad 3. Likewise, the temperature influence on the stiffness of the friction brake 1 can also be considered.

Figure 4:
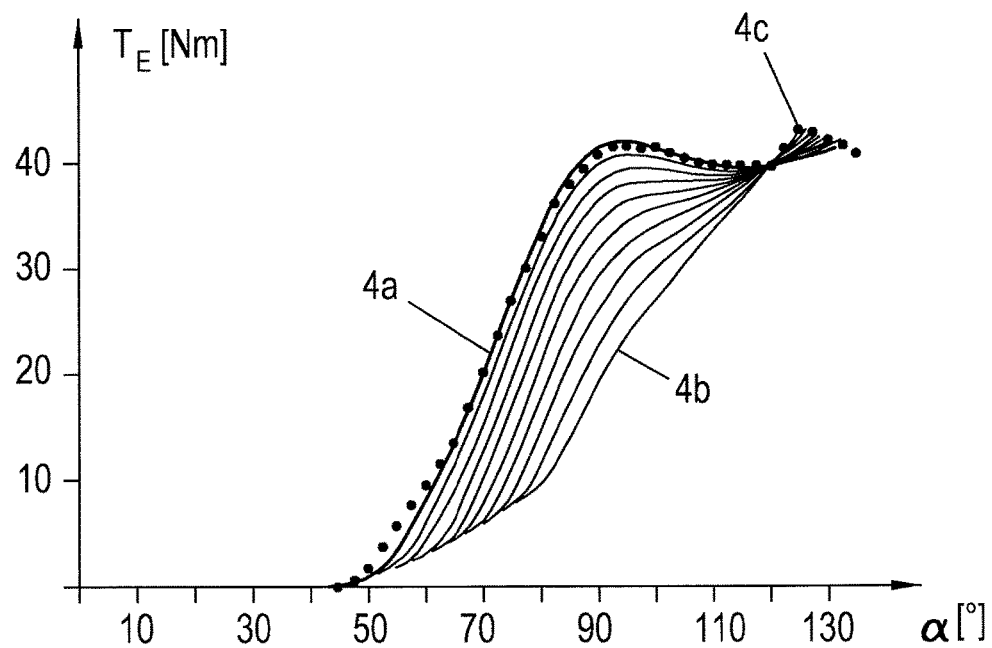
FIG. 4 shows the input torque in the first transmission element over its actuation range.

From this pad pressing force $F_N$—rotational angle α diagram, the required input torque $T_E$ of the first transmission 5 can be obtained from the known geometric relationships to achieve the pad pressing forces $F_N$, as shown in FIG. 4. Different wear states are again shown here, whereby the curve 4a again reflecting the friction brake 1 without wear, and the curve 4b the friction brake 1 with full wear. In order to be able to ensure operation of the friction brake 1 over the entire wear state, the input torque $T_E$ must cover the range that is given by the envelope curve (dotted curve 4c). This input torque $T_E$ is to be provided by the second transmission element 8, which is designed accordingly.

Figure 5:
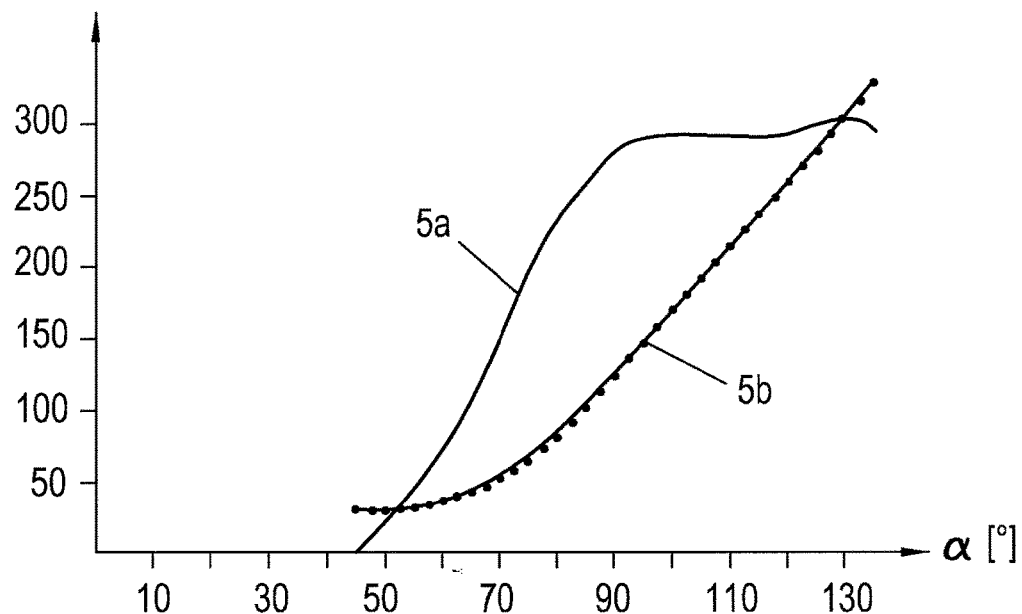
FIG. 5 shows the arising torque and path transmission characteristic of the second transmission element.

For the electrical actuator 12, however, it is especially advantageous if the latter can be operated over the entire actuation range with a torque as constant as possible (for example in case of an electric motor) or with a constant force, preferably in a range with high efficiency. Assuming a desired constant torque of the actuator 12, the input torque $T_E$ or the envelope curve in FIG. 4 (applied to the input rotational angle of the second transmission element 8) directly represents the required torque transmission characteristic (or force transmission characteristic) of the second transmission element 8. However, since the local torque transmission corresponds to the respective slope of the tangent of the path translation characteristic, the path translation characteristic, and thus the shape of the elevation curve 17, conversely results as the integral of the torque transmission characteristic, as shown in FIG. 5. In FIG. 5 the curve 5a shows the torque transmission characteristic (envelope curve with allowance for wear) and the curve 5b the integral of this curve, i.e. the path translation characteristic. The shape of the elevation curve 17 over the rotational angle α (actuation travel) can be derived directly from this in order to achieve a substantially constant torque of the electrical actuator 12. For this reason, a non-linear second transmission element 8 is preferably used, the elevation curve 17 of which is formed according to the path translation characteristic of the first transmission element 5.

For a friction brake with a transmission motor and a first transmission element according to WO 2010/133 463 A1, an actuation time of around 250 ms was measured with a pad pressing force of 40 kN. For a friction brake 1 according to the present invention, the actuation time could be reduced to around 180 ms, which represents a significant improvement.

In many electrically actuated friction brakes 1, it is required that they be self-actuating in an energy-free state (electrical actuator 12 without power) and assume an unbraked state without electrical assistance. That can be impossible with high mechanical friction in the drive of the friction brake 1, because in an electrical actuator 12, a breakaway torque or a breakaway force, which typically is made up of the mechanical bearing friction and the magnetic "snap" and can amount to 10% of the nominal torque or nominal force, must first be overcome. In addition, with a transmission motor as electrical actuator 12, for release, cranking against the gear ratio must also be performed with greater torque than present on the motor shaft. In friction brakes 1 with low mechanical drive friction and/or favorable path of actuation force, the friction brake 1 can press itself open by the high pad pressing force n specific ranges. However, this is not possible in all ranges, as for example with a very small pad pressing force (e.g. braking on ice or snow) no adequate force is available for pressing itself open against the breakaway torque. In this state, a non-electrical, storable auxiliary energy must be present for pressing open of the friction brake 1. These can for example be a release spring, which is tensioned during braking, and which releases the stored energy for pressing open the friction brake 1 when needed.

Figure 6:
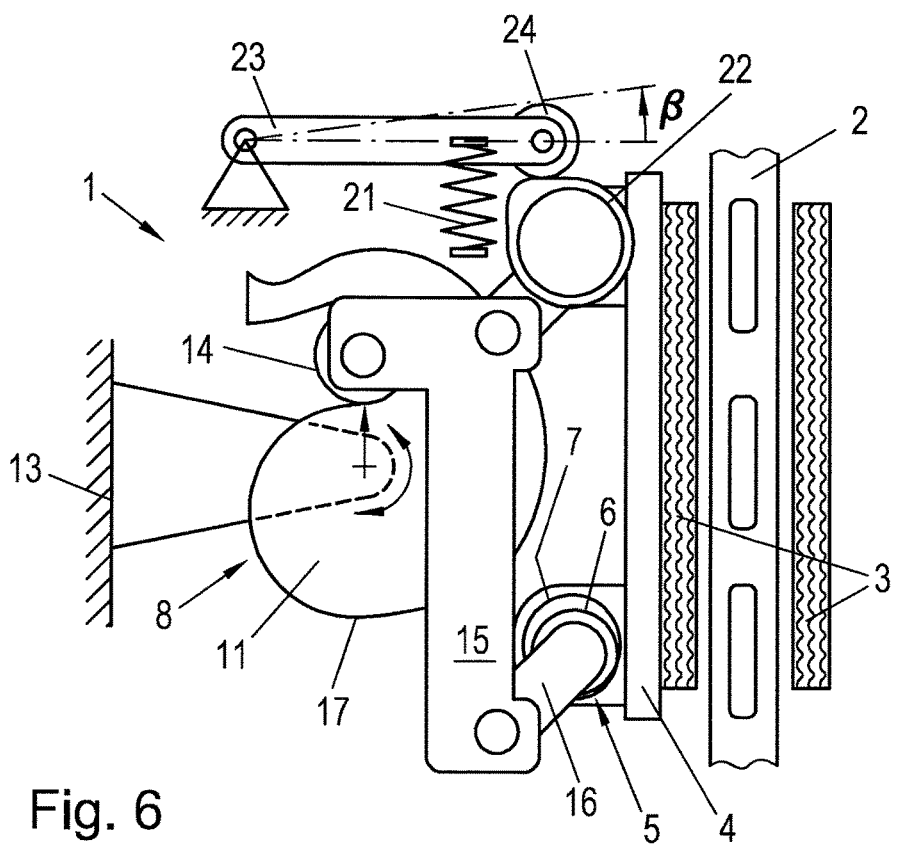
FIG. 6 shows a representation of an inventive friction brake with release spring.

When the auxiliary energy is supplied from actuation of the friction brake 1 itself, for example via a release spring, which is tensioned during brake actuation, the total actuation force (or the total actuation torque) is higher by the value of this spring action. Although the energy would not be lost, because it is recovered again no later than on release of the friction brake 1, it increases the drive torque requirement. Thus, in the simplest case, the release spring would be continuously effective according to their spring characteristic, and thus additionally effective also in the range of large actuation torques, although the release springs in such ranges would be entirely unnecessary for the pressing open of the friction brake 1. This can be counteracted with a non-linear transmission for the release spring by actuating the release spring by a suitably designed non-linear transmission, for example a release spring 21 that acts via a spring cam 22, as described below with reference to FIG. 6. The non-linear transmission is also driven by the actuation device 10.

A spring cam 22 is arranged on an actuation shaft 6 and is co-rotated with the actuation shaft 6. A spring lever 23 is rotatably mounted at one end. A spring follower element 24, here for example a rotatably mounted roller, is arranged on the other end of the spring lever 23 and the spring follower element 24 follows the spring cam 22 and rolls thereon. Kinematically speaking, a roller cam follower is therefore implemented again. A release spring 21 acts on the spring lever 23. If the spring cam 22 is rotated, the spring lever 23 is pivoted by an angle β, and the release spring 21 is thus tensioned.

However, without the spring cam 22, the release spring 21 can also act directly on the first transmission element 5 or the second transmission element 8 and release the friction brake 1 and/or support it in actuation. For example, the release spring 21 can pull or press on a lever 16 or the parallelogram drive. Through the selection of the geometry (contact point of the release spring 21 on the actuation device 10 and/or on the friction brake 1), the release spring 21 can deliver variable torques to brake actuation, which can also change magnitude and sign during actuation of the friction brake 1. For example, the return spring torque can become smaller due to the release spring 21 and the geometry when there is an increasing rotational angle α, can change sign and grow larger when there is a further increasing rotational angle α.

This release spring action, however it is caused exactly (cam, direct action of the release spring 21, etc.), can also be effected on different positions of the friction brake 1, not only on the actuation shaft 6 or the lever 16 or the parallelogram, but for example also on the cam disk 11, the shaft of the electrical actuator 12, the transmission stages of the electrical actuator 12, on a separate transmission, etc. In short, at every point of the actuation device 10 via which devices can apply the return effect or actuation effect of the release spring 21.

The release spring 21 can also have uncoupling or coupling capabilities, for example, by an electromagnet, in order for example to exert no actuation effect in an unpowered state, for example when the unpowered friction brake 1 must be forcibly moved to the released state.

The above-described method for obtaining a favorable path transmission characteristic of the second transmission element 8 does not assess the origin of the force (torque). Therefore, the release spring 21, which is always or occasionally necessary for pressing open the friction brake 1, can simply be used as an additional force. One thus obtains a total path transmission characteristic including release spring 21 for forming the transmission of the actuation device 10. The previously described procedure can now be applied to determining the elevation curve of the spring cam 24.

Figure 7:
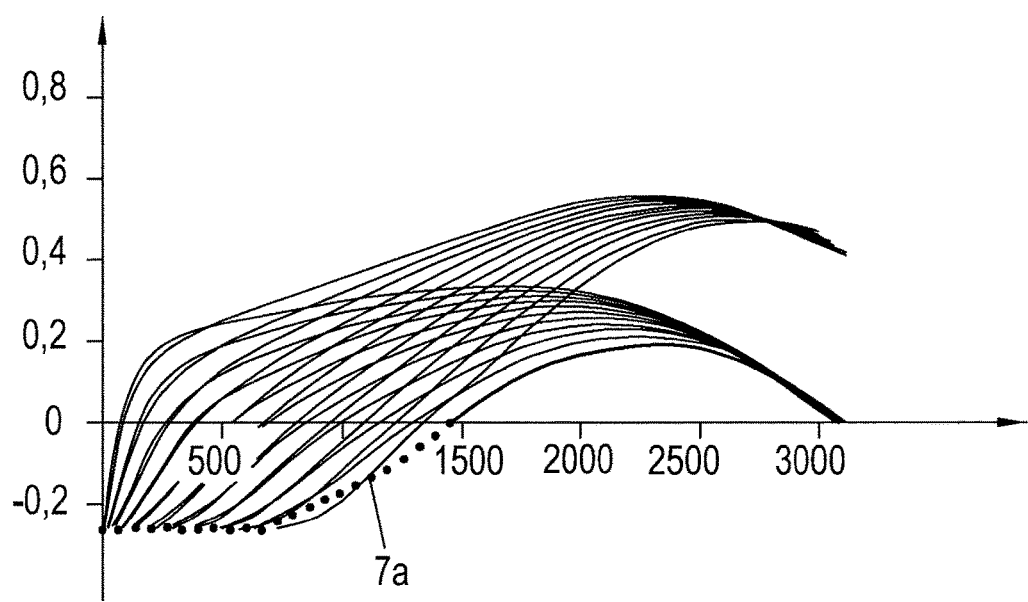
FIG. 7 shows the torque from the internal pad pressing force over the actuation range of the electrical actuator.

FIG. 7 shows the torque that the friction brake 1 exerts from its internal pad pressing force over the actuation range of the electrical actuator 12 on the latter. In the small actuation angle range, the torque is negative, that is, this negative torque is absent in order to release the friction brake 1 automatically. Again, a characteristic diagram over relevant states is used that covers all pad wear states, temperatures, and other influences. Accordingly, the dotted envelope curve 7a is the range of the absent release torques and must be supplied by auxiliary energy (for example release spring 21). The cam elevation of the spring cam 22 is thus also established by the course of the release torque (envelope curve 7a) and the given kinematics. The release spring 21 is thus only tensioned where it is used as release assistance. If the electrical power supply in this rotational angle range fails, the friction brake 1 is reliably opened by the release spring 21. Outside of this range, the release of the release spring 21 effects support of the electrical actuator 12 for the actuation process of the friction brake. In this way, the otherwise interfering release spring 21 suddenly becomes a support for actuation of the friction brake 1.

Figure 8:
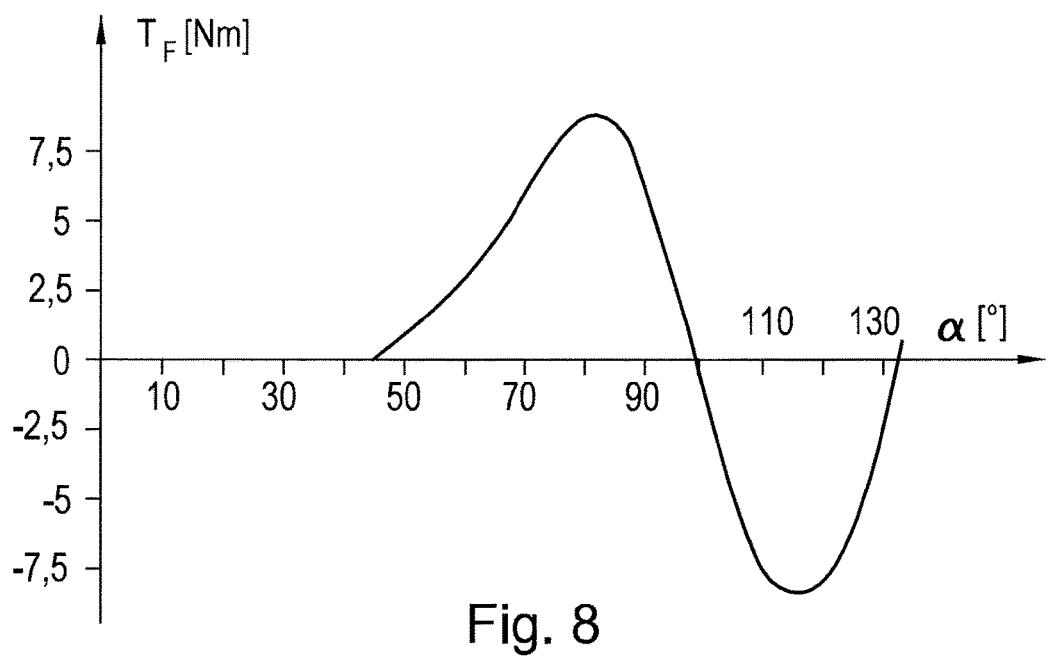
FIG. 8 shows the reset torque of the release spring over the actuation range.

The result is illustrated in FIG. 8, which shows the course of the return torque $T_F$ over the rotational angle of the spring cam 22. The return spring torque $T_F$ acts for small brake actuation as the internal force from the friction brake 1 to release the friction brake 1. With strong braking (larger rotational angle), the release spring 21 is again released, in order to support the electrical actuator 12 in brake actuation.

The transmissions of the actuation device 10 and the release spring 21 mutually influence one another. Therefore, such a friction brake 1 is generally designed in an iterative process in which the optimization steps are repeated until the improvement potential is largely exhausted. One could also proceed in a new design of a friction brake 1 from an already known favorable release spring 21 with transmission or from an already known linear or non-linear transmission of the actuation device 10.

Figure 9:
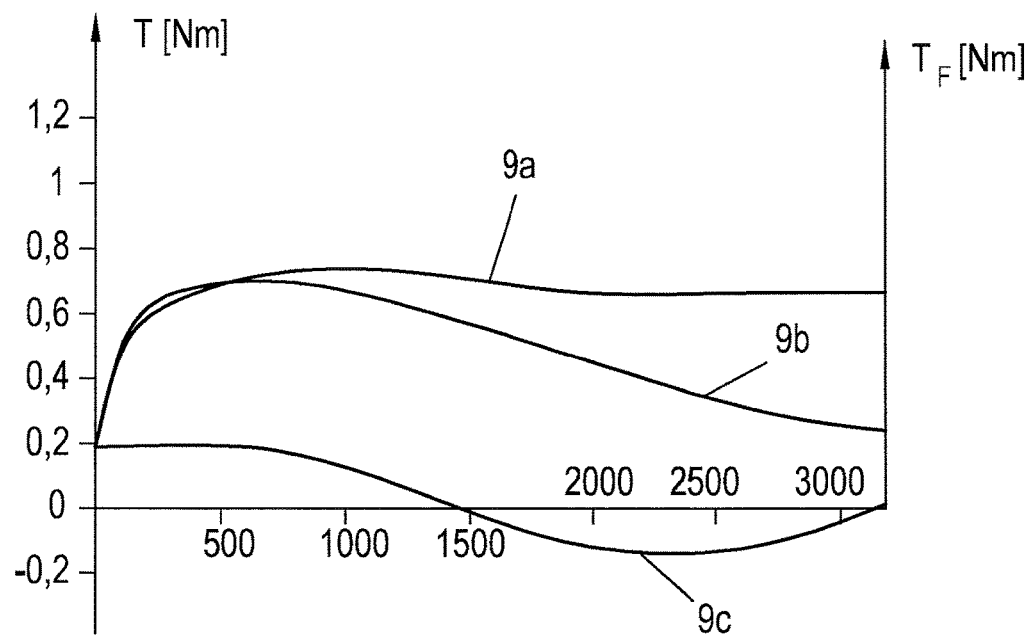
FIG. 9 shows the torque of the electrical actuator of a friction brake according to the invention.

The result of such optimization is illustrated in FIG. 9, for example. The torque T of the electrical actuator 12 (curve 9a) and the return spring torque $T_F$ of the release spring 21 (curve 9c) are shown over the actuation range of the electrical actuator. Here, the achieved, substantially constant torque T of the electrical actuator over the actuation range is readily recognized. The curve 9b additional allows for self-reinforcement effects of the friction brake 1, whereby the necessary torque T of the electrical actuator 12 naturally drops.

The friction brake 1 according to the invention was described above using the example of a brake in which force (torque) must be actively applied in order to press on the brake pads as is required for example in motor vehicles. However, the direction of action of the electrical actuator 12 is insignificant for the invention. The electrical actuator 12 can also prevent the friction brake 1 from actuation with active force (torque), whereby the direction of action would be reversed. The energy for actuation of the friction brake 1 in this case can originate from an auxiliary energy source, such as a spring, for example. Such a friction brake 1 is used, for example, as a railroad brake, elevator brake, crane brake, etc., that has to brake when there is a power loss. The above-described release spring 21 can also be used as an auxiliary energy source for braking, the actuation curve then naturally being designed favorably for the actuation behavior of the brake. For such a friction brake 1, the kinematics can be designed such that in the range to be kept open, the force (torque) at the electrical actuator 12 is as small as possible or even zero. This can occur similarly to as described above for the parking brake function over a special range of the cam disc, slide, or kinematics. A described detent latch could also be used to hold the friction brake 1 open.

In friction brakes 1 that are held in the released state by the electrical actuator 12, for example, in a railroad brake or an elevator brake, a spring, and/or the release spring 12, can of course conversely be used for actuation of the friction brake 1. The spring or the kinematics of the actuation device 10 can then also be favorably designed for this reverse actuation behavior. In these spring-actuated friction brakes 1, the actuation device 10 can be designed advantageously such that, for all cases to be covered (different or no self-reinforcement, different pad states and elasticities, different coefficients of friction, tolerances, return torque of the motor ("cogging") in different motor states (also unpowered), different friction losses in actuation, temperature, etc.), reliable actuation by the spring is always possible.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. An electrically actuated friction brake comprising:
 a brake pad that exerts a pad pressing force during brake action;
 an electric actuator configured to hold the brake pad in a released state;
 a first transmission element connected to the brake pad;
 a second transmission element having an elevation curve;
 a coupling element connected to the first transmission element and being movable relative to the brake pad;
 a follower element arranged on the coupling element and being configured to follow the elevation curve; and
 a spring that, in case of loss of power, causes the brake pad to exert brake action by causing movement of the first transmission element.

2. The electrically actuated friction brake according to claim 1, wherein the coupling element is connected to the follower element.

3. The electrically actuated friction brake according to claim 1, wherein the spring applies a force to a lever.

4. The electrically actuated friction brake according to claim 1, wherein the coupling element is connected to a first end of a first lever and a second end of the lever is connected to the first transmission element.

5. The electrically actuated friction brake according to claim 1, wherein the second transmission element is a cam disc and the spring is configured to cause rotation of the cam disc.

6. The electrically actuated friction brake according to claim 1, further comprising a third transmission element having a configuration similar to the first transmission element and being connected via a lever to the coupling element.

7. The electrically actuated friction brake according to claim 1, wherein the coupling element comprises a rocker lever.

8. The electrically actuated friction brake according to claim 1, wherein the elevation curved comprises a follower element stabilizing indentation.

9. The electrically actuated friction brake according to claim 1, wherein the first transmission element comprises one of:
 an eccentric element; or
 a cam element.

10. The electrically actuated friction brake according to claim 1, wherein the first transmission element is coupled to a cam.

11. The electrically actuated friction brake according to claim 1, further comprising:
 a spring lever having follower element coupled to one end; and
 a cam coupled to the first transmission element,
 wherein the follower element engages with the cam and the spring applies a spring force to the spring lever.

12. The electrically actuated friction brake of claim 1, further comprising:
 a third transmission element connected to the brake pad; and
 a parallelogram device that includes:
 a first lever having a first end movably coupled to the coupling element and a second end coupled to the first transmission element; and
 a second lever having a first end movably coupled to the coupling element and a second end coupled to the third transmission element.

13. An electrically actuated friction brake comprising:
 a brake pad that exerts a pad pressing force during brake action;
 an electric actuator configured to hold the brake pad in a released state;
 a first transmission element connected to the brake pad;
 a spring that biases the first transmission element toward a brake action position and that is configured to cause rotation of the first transmission element about a rotation angle;
 a second transmission element having an elevation curve and being rotated by the electric actuator,
 a coupling element connected to the first transmission element and being movable relative to the brake pad; and
 a follower element arranged on the coupling element and being configured to follow the elevation curve under action of the electric actuator when the electric actuator rotates the second transmission element,
 wherein, in case of loss of power, the spring causes movement of the first transmission element which, in turn, causes the brake pad to exert brake action.

14. An electrically actuated friction brake comprising:
 a brake pad that exerts a pad pressing force during brake action;
 an electric actuator;
 a coupling element that is movable relative to the brake pad;
 an eccentric element arranged between the brake pad and the coupling element;
 a spring capable of applying a force sufficient to cause brake action;
 a transmission element having an elevation curve and being rotated by the electric actuator; and
 a follower element coupled to the coupling element and being configured to follow the elevation curve under action of the electric actuator when the electric actuator rotates the transmission element,
 wherein, in case of loss of power, the eccentric element is caused to move which, in turn, causes the brake pad to exert brake action.

15. The electrically actuated friction brake of claim 14, further comprising a parallelogram device that includes:
 a first lever having a first end rotatably coupled to the coupling element and a second end coupled to the eccentric element; and
 a second lever having a first end rotatably coupled to the coupling element and a second end coupled to a third transmission element.

16. The electrically actuated friction brake of claim 14, wherein the coupling element is a rocker lever having a knee joint, a first leg, and a second leg coupled to the eccentric element.

17. The electrically actuated friction brake of claim 14, further comprising a spring cam and a spring follower element movably contacting the spring cam, wherein the spring biases the spring follower element toward contact with the spring cam.

* * * * *